United States Patent [19]

Thomas et al.

[11] Patent Number: 5,662,840
[45] Date of Patent: Sep. 2, 1997

[54] PROCESS FOR MAKING GEL MICROBEADS

[75] Inventors: William R. Thomas, Newtown, Pa.;
Henry A. Pfeffer, Mercerville, N.J.;
Basil A. Guiliano, Lawrenceville, N.J.;
Christopher J. Sewall, Princeton, N.J.;
Stephen Tomko, Mercerville, N.J.

[73] Assignee: FMC Corporation, Philadelphia, Pa.

[21] Appl. No.: 257,854

[22] Filed: Jun. 10, 1994

[51] Int. Cl.$^6$ ........................................ B29B 9/10
[52] U.S. Cl. .................................................. 264/12
[58] Field of Search .................................. 264/5, 12

[56] References Cited

U.S. PATENT DOCUMENTS

| | | |
|---|---|---|
| 2,438,450 | 3/1948 | Nelson . |
| 3,202,731 | 8/1965 | Grevenstuk et al. . |
| 3,329,745 | 7/1967 | La Grange ........................ 264/5 |
| 3,527,712 | 9/1970 | Renn et al. . |
| 3,639,306 | 2/1972 | Sternberg et al. . |
| 4,011,289 | 3/1977 | Noothout et al. ................ 264/12 |
| 4,016,254 | 4/1977 | Seager ............................. 424/33 |
| 4,279,632 | 7/1981 | Frosch et al. .................. 65/21.4 |
| 4,305,964 | 12/1981 | Moran et al. ................... 426/99 |
| 4,344,787 | 8/1982 | Wang et al. .................... 65/21.4 |
| 4,645,442 | 2/1987 | Wang et al. .................... 425/6 |
| 4,671,909 | 6/1987 | Torobin ........................... 264/43 |
| 4,814,274 | 3/1989 | Shioya et al. ................... 435/174 |
| 4,888,140 | 12/1989 | Schlameus et al. ............. 264/4.3 |
| 4,911,946 | 3/1990 | Singer et al. ................... 426/658 |
| 4,933,105 | 6/1990 | Fong ............................... 264/12 |
| 4,952,686 | 8/1990 | Renn et al. ..................... 536/114 |
| 4,956,128 | 9/1990 | Hommel et al. ................ 264/5 |
| 5,047,180 | 9/1991 | Steiner et al. .................. 264/5 |
| 5,091,122 | 2/1992 | Friend ............................. 264/4.33 |
| 5,126,381 | 6/1992 | Liscomb ......................... 264/12 |
| 5,153,020 | 10/1992 | Singer et al. ................... 426/657 |

FOREIGN PATENT DOCUMENTS

| | | |
|---|---|---|
| 011345 | 5/1980 | European Pat. Off. . |
| 380225 | 8/1990 | European Pat. Off. . |
| 0408257 | 1/1992 | Japan . |
| 887901 | 1/1962 | United Kingdom . |
| 9119424 | 12/1991 | WIPO . |

OTHER PUBLICATIONS

R.M. Buitelaar et al., "Immobilization of Biocatalysts in Thermogels Using the . . . ", Biotech. Techniques, vol. 2, No. 2, 109114, 1988.

V. Ghetie and H.D. Schell, "Drying to Agarose Gel Beads," Experientia 27(12) 1384–5, 1971.

A.R. Navarro et al., "Production of Ethanol by Yeasts Immobilized in Pectin", Euro J of Applied Microbiol & Technol, vol. 17, 1988.

J.C. Ogbonna et al., "Production of Micro–Gel Beads by a Rotating Disk Atomizer," J. Ferment. & Bioeng., vol. 68, No. 1, pp. 40–48 1989.

H. Su et al., Characterization of Alginate Beads Formed by a Two Fluid Annular Atomizer, Appl. Biochem. & Biotech, vol. 20/21, 1989.

*Primary Examiner*—Mary Lynn Theisen
*Attorney, Agent, or Firm*—Anthony L. Cupoli; Polly E. Ramstad

[57] ABSTRACT

A process for making gel bead having a mean diameter of less than 50 microns by adiabatically atomizing a hydrocolloid sol to droplet of less than 50 microns under conditions that lower the temperature of the hydrocolloid below its gel temperature.

18 Claims, No Drawings

PROCESS FOR MAKING GEL MICROBEADS

BACKGROUND OF THE INVENTION

1. Field of the Invention

The invention relates to the formation of gel beads, more particularly, the invention relates to the formation of gel beads using an atomizer.

2. Statement of the Related Art

The literature is replete with references to the production of hydrocolloid microparticles. Many techniques have been used to prepare hydrocolloid microparticles, such as spray processes and emulsion processes. Other references related to the production of gel beads includes the following:

James C. Ogbonna et al., "Production of Micro-Gel Beads by a Rotating Disk Atomizer," *Journal of Fermentation and Bioengineering*, Vol. 68, No. 1, pp. 40–48, 1989 teaches the production of micro-gel beads having a 200–1200 micron diameter by the atomization of an alginate with a rotating disk.

H. Suet al., "Characterization of Alginate Beads Formed by a Two Fluid Annular Atomizer," *Applied Biochemistry and Biotechnology*, Vol. 20/21, pp. 561–569, 1989, teaches the use of a two fluid atomizer to prepare alginate beads having a mean diameter in the range of 50–500 microns.

Antonio R. Navarro et al., "Production of Ethanol by Yeasts Immobilized in Pectin," *European Journal of Applied Microbiology and Biotechnology*, Vol 17, pp. 148–151, 1983, teaches the formation of pectin beads by pumping a pectin solution through a hypodermic needle to form drops which are received in a mixture of $CaCl_2.2H_2O$ and $Na_2B_4O_7 \cdot 10H_2O$, with the bead diameter being a function of the rate of extrusion and the diameter of the hypodermic needle.

R. M. Buitelaar et al., "Immobilization of Biocatalysts in Thermogels Using the Resonance Nozzle for Rapid Drop Formation and an Organic Solvent for Gelling," *Biotechnology Techniques*, Vol. 2, No. 2, pp. 109114 (1988) teaches the formation of gel beads using either a resonance needle for rapid drop formation or a needle dripping technique which also produces gel beads. K-carrageenan is taught as a gellant.

Sternberg et al. (U.S. Pat. No. 3,639,306) disclose the formation of particulates using a dual spray nozzle making small particulates, by spray drying materials into a fluidized bed.

Wang et al. (U.S. Pat. No. 4,645,442) disclose a nozzle structure, useful for making gas-filled microspheres.

Seaget (U.S. Pat. No. 4,016,254) discloses making microcapsules by spray drying, using concurrent air flow. Shioya et al. (U.S. Pat. No. 4,814,274) disclose making encapsulated bodies, in which a stream of pressurized air is exterior to a stream of gellable solution.

Other work in this field has been conducted by Frosch et al. (U.S. Pat. No. 4,279,632), Beggs et al. (U.S. Pat. No. 4,344,787), Torobin (U.S. Pat. No. 4,671,909), Schlameus et al. (U.S. Pat. No. 4,888, 140), and Friend (U. S. Pat. No. 5,091,122).

In addition the following references describe methods for encapsulating other materials within the microparticles.

British patent No. 887,901 to F. Hoffman-La Roche & Co. (CA 56, 9179 i(1961 )) discloses emulsions of a gelling colloid, including pectin and algin, which are dried into particles by spraying or atomizing into a gas at least 10° below the $t_m$ of the resultant gel, and the particles are kept separate in free fall for at least 15 seconds for gelling to begin.

U.S. Pat. No. 2,438,450 to Nelson discloses a drying technique for microparticulates comprising mixing with the hydrated micropadiculates a quantity of previously dried microparticulates to prevent agglomeration of the hydrated microparticles.

V. Ghetie and H. D. Schell, "Drying of Agarose Gel Beads", *Experientia* 27(12), 1384–5, 1971 discloses agarose microparticles which are acetone washed, then air dried at room temperature.

In addition to the above specialized drying techniques for minimizing agglomeration problems, the techniques have been used to try to prevent agglomeration of hydrocolloid microparticles. For example, U.S. Pat. No. 5, 153,020 to Singer et al., discloses water-dispersible spheroidal macrocolloid microparticles as a fat substitute with which "aggregate blocking agents," such as lecithin, pectin, xanthan gum, and carboxymethylcellulose, are added to the macrocolloid particles to stabilize the particles in the hydrated form in which the particles are manufactured and employed as fat substitutes.

U.S. 4,911,946 discloses the use of aggregate blocking agents such as lecithin and xanthan gum in hydrated spheroidal carbohydrate microparticles to, produce the mouth feel of fat/cream.

The following references disclose microparticles containing an inner core which can be a hydrocolloid, and an outer hydrophobic coating of a digestible fat: U.S. Pat. No. 4,305,964; EP-A0 011 345; and EP-A0 380 225.

U.S. Pat. No. 3,527,712 discloses a process of preparing chromatography-size agarose beads by including within an agarose gel a macromolecular hydrocolloid such as sodium alginate, potassium lambda carrageenan, carrageenan, hydroxymethylcellulose, sodium carboxymethylcellulose, and the like. Upon drying the agarose beads the macromolecular hydrocolloid becomes coagulated within the pore of the agarose. Upon rehydration, the macromolecular hydrocolloid dissolves, leaving the porosity of the gel substantially intact for its intended use in chromatography.

U.S. 4,952,686 to Rennet al. discloses an alloy gum of cassia gum and a gelling and thickening agent such as carrageenan, agar, agarose, hydroxyethylcellulose, carboxymethylceulose, dextran, and the like. This alloy gum when dried and ground into a powder can be readily dissolved in water to form a clear, stable colloidal solution.

Japanese patent publication 04/08,257 (92/08,257) (CA 116: 172746C) discloses the manufacture of dry konjac, which can be soaked in water to restore its original state and organoleptic properties, by mixing konjac with mono- and/ or oligosaccharides such as glucose, sucrose, maltose, lactose and fructose, and then drying the mixture.

WO 91/19424 (PCT published application) discloses hydrated microparticulate beads as a fat substitute composed of a hydrous hydrocolloid gel, a metal capable of causing gellation, and an ionic polysacchadde such as alginate, pectate, and sodium carboxymethyl cellulose.

None of these references teaches the production of hydrocolloid microbeads having a mean particle size of less than 50 microns; in particular, none teaches the large scale production of such micro-gel beads. Such has been considered not to be a practical product. This is perhaps not surprising since gel-forming hydrocolloid microparticles exhibit very strong propensities to aggregate when wet or even in the presence of limited moisture such as when the dry microparticles are stored in contact with air. This propensity becomes even more pronounced as the particles decrease in size.

Furthermore, microparticulates made from gel-forming hydrocolloid alone cannot be dried and then rehydrated without specialized drying techniques to prevent agglomeration, since the dried agglomerates will not disperse or will disperse very poorly in the presence of water upon attempted rehydration. Agglomerated micropadiculates cannot be used as a fat substitute since they do not possess the required organoleptic properties. It is therefore essential that dried microparticulates be capable of rehydration to their original size and shape in order to closely mimic the organoleptic properties of fat, especially in oil-in-water emulsions. This problem of agglomeration when rehydrated is not shared, or is shared to only a limited extent, with larger size hydrocolloid particles such as those disclosed in U.S. Pat. No. 3,527,712 and U.S. Pat. No. 4,952,686.

SUMMARY

The invention is a process for making gel beads having a mean particle size of less than 50 microns. In this process, a stream of a gel forming hydrocolloid sol is brought into contact with an atomizing gas stream to form hydrocolloid gel particles having a mean particle size of <50 microns.

The atomizing gas and the sol are intimately contacted with one another in a mass flow rate ratio sufficient to reduce the temperature of the hydrocolloid solution to a temperature lower than the adiabatic gelation temperature of the sol.

DESCRIPTION OF THE PREFERRED EMBODIMENTS

The gel-forming hydrocolloids used in the present invention for the manufacture of the micro gel beads are those hydrocolloids, including mixtures thereof, which gel upon cooling. These include but are not limited to the agars; agaroses, algins; low methoxyl pectins; gellans; κ-carrageenan; ι-carrageenan; furcellaran; β-carrageenan; curdlan; chitosan; konjac glucomannan and derivatives thereof including heat stable cold-melt konjac glucomannan; cellulose derivatives; starches; and mixtures of two or more of the foregoing, as well as hydrocolloid mixtures such as xanthan/locust bean gum; locust bean gumlagar; cassia/agar; cassia/xanthan; konjac/xanthan; carrageenan/locust bean gum; konjac/carrageenan; and konjac/starch. The gel forming hydrocolloid mixture given above are employed in a weight ratio of from 80:20 to 20:80, preferably 60:40 to 40:60, when used herein, the term "konjac" should always be understood as referring to the glucomannan derived from konjac and specifically from species of Amorphophallus including, but not limited to, *A. oncophyllus* and *A. rivieri*, unless indicated otherwise.

The most preferred of these hydrocolloids that gel upon cooling include carrageenan, kappa or iota; locust bean gum; *konjac glucomannan* and combinations of these. When the gas used is air, then the carrageenans are the preferred hydrocolloids because, for them, the adiabatic atomization of the hydrocolloid is alone sufficient to reduce the temperature of the micro gel to less than gelation temperature of carrageenan.

The above gel-forming hydrocolloids can be present in their native state, or can be partially depolymerized or in the form of their derivatives, provided they form gels in such variant forms. Hydrocolloids can be selected that are thermoreversible, such as agar, agarose, κ-carrageenan, ι-carrageenan, β-carrageenan and xanthan/locust bean gum, or thermo-irreversible, such as alkali-set konjac, curdian, and calcium alginate.

It is to be understood that while some of the above hydrocolloids will form gels without further treatment, many others require conversion to their potassium and/or alkaline earth metal salts, such as the calcium or magnesium salt, and for such hydrocolloids, such salt forms are the gel forming hydrocolloids used in the invention. Methods for preparing such salts are well known in the art and do not comprise part of the present invention.

It is also to be understood that the hydrocolloids being used in the process of this invention are used, not as dry hydrocolloid, but as a sol. Methods for preparing such sols are well known in the art and do not comprise part of the present invention. The hydrocolloid solution is preferably formed using water as the solvent because water is environmentally safe. However, for some hydrocolloids other solvents may be used alone or in conjunction with water to provide the necessary cooling effect.

If a micro-gel is desired as a carrier for another agent or material, that agent or material can be included in the sol. Such agents or materials include a water immiscible liquid, such as an oil; a water miscible agent that does not prevent gelation; a fine particulate solids, such as a metal; a biological agent; an enzyme; a chemical initiator, and the like, which are compatible with the sol, and with the process conditions of this invention.

If a rehydrateable micro-gel is desired, then the hydrocolloid sol should include a non-gelling hydrocolloid. The water-soluble, non-gelling, hydration enhancing hydrocolloid materials that can be used alone or in combination in the practice of the invention are water-soluble, non-gelling hydrocolloids such as the following: galactomannans, for example, water-soluble locust bean gum, guar gum, cassia, tara, and the like; water-soluble forms of konjac; starches, such as corn, potato, cereal, and tapioca; water-soluble cellulose derivative, such as carboxymethylcellulose and hydroxymethylcellulose and their sodium salts; water-soluble synthetic polymers such as linear polyacrylamide, polyvinyl alcohol, polyethylene glycol, polyethylene oxide, PVP, and the like; λ-carrageenan or the sodium salts of algin or pectin; water-soluble xanthan gum; and the like. In a preferred embodiment, the rehydrateable gel-microbeads include carrageenan and one or more of these non-gelling hydrocolloids.

The invention is a process for making gel beads with a mean particle size of less than 50 microns, preferably within the range of 5 to 30 microns, more preferably within the range of 8 to 20 microns, and most preferably within the range of 10 to 15 microns, as determined by microscopic examination. To achieve this product, the following are required: a hydrocolloid, an atomizing gas; and a means for atomizing the hydrocolloid with the gas.

In this process for making gel beads, the gas is used to atomize a hydrocolloid sol. If the sol is contacted with the atomizing gas in a complete and intimate manner during the atomization process, the atomization process can evaporate the solvent from the sol, and reduce the temperature sufficiently to produce gel microbeads. It will do so if the mass rate of the atomizing gas relative to the mass rate of the sol is sufficient to atomize the feed to an appropriate droplet particle size and to remove the heat from the sol to bring the temperature of the micro-gel bead made by the process to its gel point or lower. Factors that can be considered are the heat capacity of the gas and the sol feed, the temperature of the gas and the sol just before atomization, the relative humidity of the gas, the amount of moisture in the sol, and the ambient temperature and humidity.

The process must utilize a spraying apparatus that can use the gas to atomize the sol to an appropriate mean particle size. That is, the initially atomized droplets produced must be small enough to permit a final micro-gel particle product size of 50 microns or less. The atomizing gas should completely and intimately contact the sol during the initial spraying for effective evaporative cooling to take place. The more complete, intimate, and immediate the contact between the entire gas flow and hydrocolloid feed at the time of initial spraying, the more efficient the process. Such contact optimizes the opportunity for the solvent to be stripped from the hydrocolloid feed and for the heat to be transferred from the feed to the gas. Generally, effective atomization occurs in close proximity to the nozzle and the evaporative cooling is essentially instantaneous at the time the droplets are formed.

The Schlick model 0/5 two fluid nozzle, a product of Schlick-Dusen, accomplishes these tasks. This two-fluid nozzle can be used to simultaneously spray the hydrocolloid feed and the gas, to atomize the hydrocolloid feed, and produce the desired micro-gel beads. The spray port for the hydrocolloid feed and for the gas are adjacent to each other. They are arranged, so the gas contacts the hydrocolloid feed within a few millimeters, and a few micro seconds of each exiting the nozzle. The gas and the hydrocolloid feed are instantaneously and completely, contacted and mixed, producing the sol droplet with heat transfer from the feed sol and solvent evaporation occurring essentially instantaneously.

This Schlick model 0/5 produces a conical spray within which the feed sol is atomized by the gas. The angle of the cone can be varied. Generally, the smaller the angle the more energetic, and complete the entire process will be. For this particular model nozzle, it is best to adjust the nozzle to produce of cone of less than 30°, and preferably less than 25°. Other nozzles may permit greater spray angles, other other spray geometries.

Other factors which can be considered in this micro bead production are the difference in temperature between the sol feed solution and the gel point of the hydrocolloid, which must be small enough to enable the produced hydrocolloid droplets to cool at the gas flow rate being used; the diameter of the hydrocolloid droplet produced, according to this method, must permit conductive heat transfer to cool the center of the droplet quickly enough so that the droplet gels before it strikes the collection chamber wall. Finally, the atomizing gas and the hydrocolloid solution needs to be intimately mixed to permit the evaporating solvent needed to cool the sol to, or below, its gel temperature to be transferred to the gas.

Microgel beads can thus be made by causing a stream of gas to intersect a stream of hydrocolloid sol, under the conditions just described. Such can be accomplished by intersecting the gas stream and the hydrocolloid sol stream at any angle that will afford the requisite, complete, intimate contact, as close as possible to the point of spray initiation to bring about sufficiently rapid cooling and and microbead formation.

The microbead product made according to this process ranges from a free flowing liquid at small bead diameters to a viscous paste at coarse bead diameters. The diameter of the beads can be varied by adjusting the pressure of the air feeding the nozzle.

For a two fluid spray nozzle, this ratio may be determined using the following energy balance equation:

Equation 1
$$\frac{M_1}{M_{gas}} \leq \frac{MW_{gas}C_{p\,gas}(T_{gas2} - T_{gas})(100P_T - RH\,P_{sat}) + 18\lambda RH\,P_{sat}}{MW_{gas}C_{pf}(100\,P_t - RH\,P_{sat})(T_{sol} - T_{gel})}$$

where:

$M_1$=Mass rate of Sol, g/hr $M_{gas}$=Mass rate of gas, g/hr $MW_{ga}$=Molecular weight of gas, g/g-mol $C_{p\,gas}$=Heat capacity of gas, cal/g-°C.

$T_{gel}$=Gel temperature of feed sol exiting nozzle, °C.

$T_{gas}$=Temperature of inlet gas $T_{gas2}$+Temperature of outlet gas, °C.

$P_T$=Pressure of exit gas from bead collection tank, bar

RH=Relative humidity of exit gas, %

$P_{sat}$+Water vapor pressure at exit temperature, bar $\lambda$=Heat of evaporation of water at exit gas temperature, cal/g $C_{pf}$=Heat capacity of sol feed, cal/g -°C.

$T_{sol}$=Temperature of feed solution, °C.

If Equation (1) is applied, then micro-gel formation occurs essentially instantaneously after atomization of the hydrocolloid. That is gel beads can be formed within a sandwich bag using a laboratory nozzle with a 1-mm insert. This means that production can occur without the need for the long distances provided by a tall tower. Moreover, production can occur without the need to provide refrigeration, air conditioning or other post atomization cooling, as long as a hydrocolloid with an appropriate gellation temperature is chosen.

Although production can occur within a very small volume, it is necessary to provide ventilation for the water vapor that is produced during the atomization process. Small production areas can be used because the gel forms in a non-agglomerating state, essentially instantaneously, upon atomization of the feed sol.

Generally, if the spray for both the atomizing gas and the hydrocolloid sol to be atomized is in a downward direction, the microbeads will collect at the bottom of the production tank, and the water vapor will rise upwards and out of the tank. Moreover, the exhaust will include only the water vapor and the gas used for atomization, because of the density of the microbeads. If that gas is air, then their is no significant pollution problem.

The microbeads, having a mean particle size of less than 50 microns, behaves as a liquid. The microbeads are so small that they flow over one another as water. In fact, a carrageenan microbead is not readily distinguished from water.

The invention can be appreciated from the following examples, which are intended as a further illustration of the invention, but not as a limitation on the scope of the invention. All parts and percentages in the examples, and throughout the specification and claims are by weight, and all temperatures are in degrees centigrade, unless otherwise indicated.

EXAMPLE 1

A hydrocolloid solution, which gels at about 50° C. was prepared as follows: a hydrocolloid solution was prepared which contained 2% kappa carrageenan, 0.2% potassium chloride, and 0.1% calcium chloride dihydrate. The hydrocolloid solution was sprayed through a two-fluid nozzle as follows:

| | |
|---|---|
| Solution Rate | 200 lb/hr (90.7 kg/hr) |
| Air Rate | 73 scfm (151.8 kg/hr) |
| Solution Feed Temperature | 79° C. |
| Air Pressure at Nozzle | 80 psig |
| Spray Cone Angle | 10° |

When air at 21° C. is used as the gas medium, Equation (1) may be reduced to the following:

$$\frac{M_1}{M_{air}} \leq \frac{7.25(T_{air2} - 21.0)(100\, P_T - RH\, P_{sat}) + 18\lambda\, RH\, P_{sat}}{29\, C_{pl}(100\, P_t - RH\, P_{sat})(T_{sol} - T_{gel})} \quad \text{Equation 2}$$

where:

$M_1$=Mass rate of Sol, g/hr $M_{gas}$=Mass rate of gas, g/hr $MW_{gas}$=Molecular weight of gas, g/g-mol $C_{pair}$=0.25-cal/g-°C.

$T_{gel}$=50° C.

$T_{sol}$=79.0° C.

$T_{air2}$=21.0° C.

$T_{air}$=29.8° C.

$P_T$=1.0-atm=1.013 Bar $R_H$=100%

$P_{sat}$=0.0406-atm =0.0411 Bar $\lambda$=580.5-cal/g $C_{pl}$=1.0 cal/g-°C.

$T_{sol}$=90° C.

Compare the calculated results from Equation (2) with the experimental data.

From Equation (2), $M_1/M_{air}$ is calculated as follows:

$$\frac{M_1}{M_{air}} \leq \frac{7.25(29.8 - 21.0)[100(1.013) - 100(0.0411)] + 18(580.5)(100)(0.0411)}{29[100(1.013) - 100(0.0411)](1)(79 - 50.0)}$$

$$\frac{M_1}{M_{air}} \leq 0.601$$

An experiment, conducted using a two-fluid nozzle, produced microbeads in the 10 to 15-micron range. The operative conditions were a 200-lb/hr (90.7 Kg/Hr) sol rate and an 80-psig (6.36 Bar) nozzle gas pressure, using the Schlick two fluid nozzle with an 0.8-mm liquid insert. The corresponding air rate for the 80-psig (6.36 Bar) pressure is 73-scfm (151.8 Kg/hr). Based on the above data, the $M_1/M_{air}$ rate is calculated as $$\frac{M_1}{M_{air}} \leq \frac{90.7 \text{ kg/hr}}{151.8 \text{ kg/hr}} = 0.598$$

This satisfies the constraint set by the equation above where $M_1/M_{air} \leq 0.0.6016$.

EXAMPLE 2

Using an airflow rate of 32 scfm (66.6 kg/hr), but otherwise the same conditions as in Example 1, no beads were formed, rather, a gel mass collected in the bottom of the tank.

For this experiment the energy balance constraint, $M_1/M_{air}$, is calculated to be the following:

(90.7 kg/hr)/(66.6 Kg/hr)=1.36

No beads were formed because this energy balance constraint is greater than the energy balance constraint calculated in Example 1, $M_1/M_{air}$=0.598.

Thus, the energy balance equation can be used to predetermine necessary process parameters.

EXAMPLE 3

If carbon dioxide at 21° C. is substituted for air, as the gas medium, in Example 2, then Equation (1) may be reduced to the following:

$$\frac{M_1}{M_{CO_2}} \leq \frac{11.00(T_{CO_2} - 21.0)(100\, P_T - RH\, P_{sat}) + 18\lambda\, RH\, P_{sat}}{44\, C_{pl}(100\, P_T - RH\, P_{sat})(T_{sol} - T_{gel})} \quad \text{Equation 3}$$

A mass ratio equivalent to that provided by Equation (1) must be attained in order to obtain micro-gel formation whether or not the process is performed using a two fluid nozzle.

$$\frac{M_1}{M_{CO_2}} \leq \frac{11.00(29.8 - 21)[100(1.013) - (100)(0.0411)]18(580.5)(100)(0.0411)}{44[100(1013) - (100)(0.0411(1)(79 - 50]}$$

Gel beads form because the energy balance constraint is favorable.

EXAMPLE 4

Using a spray cone angle of 30°, but otherwise the same conditions as in Example 1, no beads were formed, only a gel mass in the tank bottom. The atomizing air is not intimately mixed with the sol droplet and is thus inadequate to create non-agglomerating gel beads.

EXAMPLE 5

Using an air pressure of 63 psig, but otherwise the same conditions as in Example 1, a more viscous product was obtained due to a larger bead of from 20 to 40 microns.

EXAMPLE 6

Encapsulation of a Solid in a Kappa Carrageenan Gel Matrix

In the laboratory, a sol containing 2% kappa carrageenan, 2% aluminum hydroxide (solid to be encapsulated which is 98%, 325 mesh), 0.2% potassium chloride, 0.1% calcium chloride dihydrate, 0.1% sodium benzoate and 95.8% water was prepared. The dissolution laboratory apparatus consisted of a 4-liter resin kettle with cover, heating mantle, mixer; glass overhead condenser and thermometer. Water was charged to the dissolution kettle, and the mixer was activated. Potassium hydroxide, calcium chloridedihydrate and sodium benzoate were then charged. After the salts were dissolved, the kappa carrageenan was fed at a slow rate to disperse it into the solution. If the charge is too rapid, the carrageenan will clump which will hinder dissolution. The mixture was then heated to 90°–95° C. to dissolve the dispersed kappa carrageenan. The aluminum hydroxide was then dispersed into the heated solution. The slurry was then transferred to the spray chamber by a peristaltic pump. The transfer lines were heat traced with electrical tape to prevent cooling of the slurry which will result in premature gelling. The spray chamber consisted of a two fluid spray nozzle (970 series Schlick two substance nozzle with 1.0 mm liquid insert) and a 12-gallon stainless steel disengagement vessel. The slurry is pumped through the nozzle at 22-grams per minute. The nozzle was set in the narrow spray position. The atomizing medium was air at 80-psig. The resulting gel is collected in the disengagement vessel while the air is scrubbed prior to discharge. The atomization of the slurry produced flowable gel with liquid properties. When viewed under a microscope, the gel consisted of aluminum hydroxide particles, encapsulated in the kappa carrageenan microbeads.

EXAMPLE 7

Iota Carrageenan/Kappa Carrageenan Microbeads

In the laboratory equipment described in Example 6, a solution consisting of 1% iota carrageenan salt, 1% kappa carrageenan, 0.2% potassium chloride, 0.3% calcium chloride dihydrate and 97.5% water was prepared in the dissolution vessel at 95° to 100° C. The sol was sprayed at 28 grams/minute through the two substance laboratory spray nozzle, with a 1-mm insert,in the narrow spray setting. Air at 40 psig was used to atomize the liquid. The resulting product was flowable and, when viewed under the microscope, consisted of distinct microbeads. Also, when the product was centrifuged at 2700 rpm for 30 minutes no phase separation occurred.

EXAMPLE 8

Locust Bean Gum/Kappa Carrageenan Microbeads

In the laboratory equipment described in Example 6, a sol consisting of 0.5% locust bean gum, 1.5% kappa carrageenan and 98% water was prepared in the dissolution vessel at 95° to 100° C. The solution was sprayed at 28 grams per minute through the two substance laboratory spray nozzle in the narrow spray setting with a 1 mm liquid insert. Air at 50 psig was used to atomize the solution in the spray nozzle. The gel product consisted of a very soft gel different from the flowable gels made in the above samples. When diluted with water and viewed under a microscope, the product contained microbeads which tended to clump together.

EXAMPLE 9

Encapsulation of an Immiscible Oil in a Kappa Carrageenan Gel Matrix

In laboratory equipment similar that used in the above examples, a solution containing 2% kappa carrageenan, 0.2% potassium chloride, 0.2% calcium chloride dihydrate, 1% glycerin and 94.1% water was prepared in the dissolution vessel at 90° to 100° C. After dissolution, 1.5% canola oil (the oil to be encapsulated) with 1% Tween 80 was added at a high agitation rate. An emulsion was formed, which was then passed through a static mixer (¼-in×6 in) prior to spraying to maintain the emulsion prior to gel formation. The spray rate for the emulsion was 43-gram/minute through the two substance laboratory spray nozzle. The nozzle was set in the narrow position with a 1-mm liquid insert. Atomizing air at 40-psig was used. The resulting product was flowable. Microscopic examination indicated that microbeads were formed containing canola oil in the microbead gel matrix.

We claim:

1. A method for preparing a gel bead, comprising
spraying a sol of a hydrocolloid, or a hydrocolloid mixture, which gels on cooling, and an atomizing gas stream from a nozzle whose effective configuration produces sol droplets having a mean size of less than 50 microns; and
simultaneously contacting the hydrocolloid sol in a complete and intimate manner with the atomizing gas to evaporatively cool the sol;
wherein the atomizing gas and the sol being atomized are present in a rate ratio that is sufficient to flash cool the sol to a temperature at least as low as the gelation temperature of the sol.

2. The method of claim 1, wherein a sufficient rate ratio of atomizing gas to sol is expressed by the following equation:

$$\frac{M_1}{M_{gas}} \leq \frac{MW_{gas}C_{p\,gas}(T_{gas2} - T_{gas})(100\, P_T - RH\, P_{sat}) + 18\lambda\, RH\, P_{sat}}{MW_{gas}C_{pf}(100\, P_t - RH\, P_{sat})(T_{sol} - T_{gel})}$$

where:

$M_1$=Mass rate of sol, g/hr
$M_{gas}$=Mass rate of gas, g/hr
$MW_{gas}$=Molecular weight of gas, g/g-mol
$C_{pgas}$=Heat capacity of gas, cal/g-°C.
$T_{gel}$=Gel temperature of gel exiting nozzle, °C.
$T_{gas}$=Temperature of inlet gas
$T_{gas2}$=Temperature of outlet gas, °C.
$P_T$= Pressure of exit gas from bead collection tank, atm
RH=Relative humidity of exit gas, %
$P_{sat}$=Water vapor pressure at exit temperature, atm
$\lambda$=Heat of evaporation of water at exit gas temperature, cal/g
$C_{pf}$=Heat capacity of sol feed, cal/g-°C.
$T_{sol}$=Temperature of feed sol, °C.

3. The method of claim 2, wherein the gas is air.

4. The method of claim 3, wherein hydrocolloid sol or hydrocolloid mixture is an agar; agarose, algin; low methoxyl pectin; gellan; K-carrageenan; ι-carrageenan; furcellaran; β-carrageenan; curdlan; chitosan; konjac glucomannan or a derivative; a cellulose derivative; a starch; a mixture of two or more of the foregoing, or one of the following hydrocolloid mixtures: xanthan/locust bean gum; locust bean gum/agar; cassia/agar; cassia/xanthan; konjac/xanthan; carrageenan/locust bean gum; konjac/carrageenan; and konjac/starch.

5. The method of claim 3, wherein the hydrocolloid sol further includes a water immisicible liquid.

6. The method of claim 3, wherein the hydrocolloid sol further includes a fine particulate solid that is smaller than the gel bead being produced.

7. The method of claim 3, wherein the hydrocolloid sol further includes a water miscible agent that does not prevent gel bead formation.

8. The method of claim 3, wherein the hydrocolloid sol further includes a microorganism.

9. The method of claim 3, wherein the hydrocolloid sol further includes a biological agent.

10. The method of claim 1, wherein the gas and the hydrocolloid sol are contacted with sufficient energy to instantaneously separate the sol into discrete gel particles having a mean particle size of <25 microns, to instantly dehydrate the gel particles within less than one second of contact and to provide a temperature drop sufficient to form microgels that freely flow with respect to one another.

11. The method of claim 1, wherein the gas and the hydrocolloid sol separately exit the nozzle to mutually form a cone having an angle of <25°, within which cone the sol particles are formed.

12. The method of claim 11, wherein the cone has an angle of <15°.

13. The method of claim 1, wherein the temperature of the hydrocolloid sol stream and the temperature of the atomizing gas stream are above the gel temperature of the hydrocolloid prior to contact, but below the gel temperature immediately after atomization.

14. The method of claim 2, wherein the hydrocolloid sol stream and the atomizing gas stream are directed in a downward direction, and the gel microbeads formed in the process are collected in an underlying vessel as a free flowing collection.

15. The method of claim 1, wherein the gel forming hydrocolloid sol includes a carried substance.

16. The method of claim 15, wherein the carried substance is an aluminum compound.

17. The method of claim 15, wherein the carried substance is a salt.

18. The method of claim 1, wherein the stream of sol of the hydrocolloid is passed through one channel of a two-fluid nozzle, the atomizing gas stream is passed through another channel of the two-fluid nozzle, and contacting of the stream of the sol with the atomizing gas stream occurs as each stream exits the two-fluid nozzle.

* * * * *